(12) United States Patent
Shiota

(10) Patent No.: US 10,994,346 B2
(45) Date of Patent: May 4, 2021

(54) INDEXABLE DRILLING TOOL

(71) Applicant: TUNGALOY CORPORATION, Fukushima (JP)

(72) Inventor: Yusuke Shiota, Iwaki (JP)

(73) Assignee: TUNGALOY CORPORATION, Iwaki (JP)

( * ) Notice: Subject to any disclaimer, the term of this patent is extended or adjusted under 35 U.S.C. 154(b) by 0 days.

(21) Appl. No.: 16/213,998

(22) Filed: Dec. 7, 2018

(65) Prior Publication Data

US 2019/0176249 A1 Jun. 13, 2019

(30) Foreign Application Priority Data

Dec. 8, 2017 (JP) .............................. JP2017-236529
Nov. 7, 2018 (JP) .............................. JP2018-209888

(51) Int. Cl.
*B23B 51/04* (2006.01)

(52) U.S. Cl.
CPC ...... *B23B 51/048* (2013.01); *B23B 2251/201* (2013.01); *B23B 2251/424* (2013.01); *B23B 2251/50* (2013.01)

(58) Field of Classification Search
CPC ........ B23B 2251/424; B23B 2251/201; B23B 2251/085; B23B 2251/50; B23B 2200/204; B23B 2200/126; B23B 51/048
See application file for complete search history.

(56) References Cited

U.S. PATENT DOCUMENTS

| | | | | |
|---|---|---|---|---|
| 2,882,765 A | * | 4/1959 | Andreasson | B23B 51/0486 408/59 |
| 2,895,355 A | * | 7/1959 | Kleine | B23B 51/0486 408/59 |
| 3,125,799 A | * | 3/1964 | Bennett | B23B 51/048 407/35 |
| 3,203,493 A | * | 8/1965 | Reidar | B23B 51/048 175/383 |
| 3,490,315 A | * | 1/1970 | Melchiorre | B23D 77/044 408/153 |
| 3,834,829 A | * | 9/1974 | Munro | B23C 5/2406 408/179 |
| 4,279,550 A | | 7/1981 | Kress et al. | |

(Continued)

FOREIGN PATENT DOCUMENTS

| | | |
|---|---|---|
| JP | S51-097880 A | 8/1976 |
| JP | H05-085511 U | 11/1993 |

(Continued)

*Primary Examiner* — Ryan C Rufo
(74) *Attorney, Agent, or Firm* — Studebaker & Brackett PC

(57) ABSTRACT

An indexable drilling tool includes a cutting insert and a body. The body has a cylindrical shape. The body has a chip discharge groove and a tip seat. The chip discharge groove is in an outer circumference of the body. The tip seat is at a distal end of the body. The tip seat where the cutting insert is placeable wherein. Among wall surfaces constituting the chip discharge groove, a wall surface facing in a direction opposite to a rotating direction of the body. The wall surface has a bulging portion at a distal end thereof. The bulging portion protrudes so as to cover a part of a top surface of the cutting insert. A maximum gap between the bulging portion and the top surface of the cutting insert is smaller than a height of a wall constituting the tip seat.

9 Claims, 11 Drawing Sheets

(56) References Cited

U.S. PATENT DOCUMENTS

| | | | | |
|---|---|---|---|---|
| 5,340,246 | A | * | 8/1994 | Tukala .................. B23B 51/048 408/224 |
| 2004/0096283 | A1 | * | 5/2004 | Nomura .................. B23B 31/11 408/59 |
| 2005/0244237 | A1 | * | 11/2005 | Kuenzel ................ B23B 51/048 408/59 |
| 2006/0159535 | A1 | * | 7/2006 | Nuzzi ................. B23B 51/0009 408/227 |
| 2008/0181737 | A1 | * | 7/2008 | Limell ................ B23B 27/1614 408/188 |
| 2009/0047080 | A1 | | 2/2009 | Schweighofer et al. |
| 2010/0111627 | A1 | * | 5/2010 | Bae ....................... B23B 51/048 408/200 |
| 2011/0033255 | A1 | * | 2/2011 | Nomura ............. B23B 51/0486 408/1 R |
| 2011/0293381 | A1 | | 12/2011 | Saji |
| 2013/0315684 | A1 | * | 11/2013 | Ramesh ................ B23B 27/145 408/231 |

FOREIGN PATENT DOCUMENTS

| | | | |
|---|---|---|---|
| JP | H10-180515 A | | 7/1998 |
| JP | 2008-529811 A | | 8/2008 |
| JP | 2012-143866 A | | 8/2012 |
| SU | 1458107 A | * | 2/1989 ............. B23B 51/06 |
| WO | 2010/092807 A1 | | 8/2010 |

* cited by examiner

INDEXABLE DRILLING TOOL

CROSS-REFERENCES TO RELATED APPLICATIONS

This application relates to and claims priority from Japanese Patent Application No. 2017-236529, filed on Dec. 8, 2017 and Japanese Patent Application No. 2018-209888, filed on Nov. 7, 2018, the entire disclosure of which are incorporated herein by reference.

BACKGROUND

Field

The present invention relates to an indexable drilling tool, and more particularly, to an indexable drilling tool having a small diameter and configured to process a deep hole.

Description of Related Art

When manufacturing a gun drill having a relatively small diameter, the sizes of a cutting insert and a tip seat where the cutting insert is placed are inevitably reduced. A small tip seat means that the height of a restriction wall surrounding the tip seat (a wall in contact with the cutting insert) is also low. When the restriction wall is low, an end portion of the cutting insert floats in the course of fixing the cutting insert by a screw, and even if the cutting insert has run on the restriction wall, a user may be unaware of the fact that the cutting insert has run on the restriction wall due to the low restriction wall. If cutting processing is performed in this state, the cutting insert and the body are damaged.

Thus, a method other than screwing is required for a small-diameter gun drill. Patent Publication JP-A-S51-97880 discloses a countermeasure and a deep hole tool capable of replacing a cutting edge. In the deep hole tool in Patent Publication JP-A-S51-97880, a cutter plate (also referred to as "cutting insert") having a cutting edge is pressed and fixed by a clamping claw from a rake face side.

SUMMARY

In the case of the method of fixing the cutting insert as disclosed in Patent Publication JP-A-S51-97880, the clamping claw is a separate member, and hence reliably fixing the cutting insert requires pressing a large part of the rake face. Thus, the size of the clamping claw is increased, and the clamping claw occupies a large space in the chip discharge groove. As a result, chip discharge performance is reduced.

The present invention has been made in view of the above-mentioned problem, and it is an object thereof to provide an indexable drilling tool capable of preventing a cutting insert from being mounted with an incorrect posture. It is another object of the present invention to provide an indexable drilling tool capable of preventing discharge performance of chips from being decreased.

An indexable drilling tool according to one aspect of the present invention includes: a cutting insert; and a body, in which a bulging portion that protrudes to an outer peripheral direction of the body is formed at a distal end of one groove wall of a chip discharge groove formed in an outer circumference of the body so as to cover a part of a top surface of the cutting insert, and a maximum value of a gap between the bulging portion and the top surface of the cutting insert is smaller than a height of a wall constituting a tip seat.

In the above-mentioned aspect, a tool diameter may be 15 mm or less.

When the tool diameter of the drilling tool is set to 15 mm or less, the sizes of the cutting insert and the tip seat where the cutting insert is placed are reduced. A small tip seat means that the height of a restriction wall surrounding the tip seat is also low. If the cutting insert is placed from a direction perpendicular to the bottom surface of the tip seat, the restriction wall of the tip seat and the bottom surface of the cutting insert may contact each other, and the cutting insert may be mounted while being inclined with respect to the bottom surface of the tip seat.

In this aspect, however, the bulging portion is formed, and hence the cutting insert cannot be placed from the direction perpendicular to the bottom surface of the tip seat. Thus, the cutting insert can be prevented from being mounted with an incorrect posture.

In the above-mentioned aspect, it is preferred that when the cutting insert is seen from a direction opposed to the top surface, a plurality of step portions be formed on a cutting edge.

According to this aspect, narrow chips flow out of the cutting edges divided by the step portions, and hence the chips can be segmentalized.

In the above-mentioned aspect, L/D may be 10 or more, where L represents the length of the chip discharge groove, and D represents the tool diameter.

When manufacturing a small-diameter gun drill in which L/D is 10 or more, the sizes of a cutting insert and a tip seat where the cutting insert is placed are reduced. A small tip seat means that the height of a restriction wall surrounding the tip seat is also low. When the restriction wall is low, an end portion of the insert floats in the course of fixing the insert by a screw, and even if the insert has run on the restriction wall, a user may be unaware of the fact that the insert has run on the restriction wall due to the low restriction wall. If cutting processing is performed in this state, the insert and the body are damaged.

In this aspect, however, the bulging portion is formed, and hence even an indexable drilling tool having a small diameter such as L/D of 10 or more and configured to process a deep hole can prevent a cutting insert from being mounted with an incorrect posture.

According to the present invention, an indexable drilling tool capable of preventing a cutting insert from being mounted with an incorrect posture can be provided. Further, an indexable drilling tool capable of reliably fixing even a cutting insert having a small diameter, and minimizing reduction of chip discharge performance can be provided.

DETAILED DESCRIPTION

Figure 1:
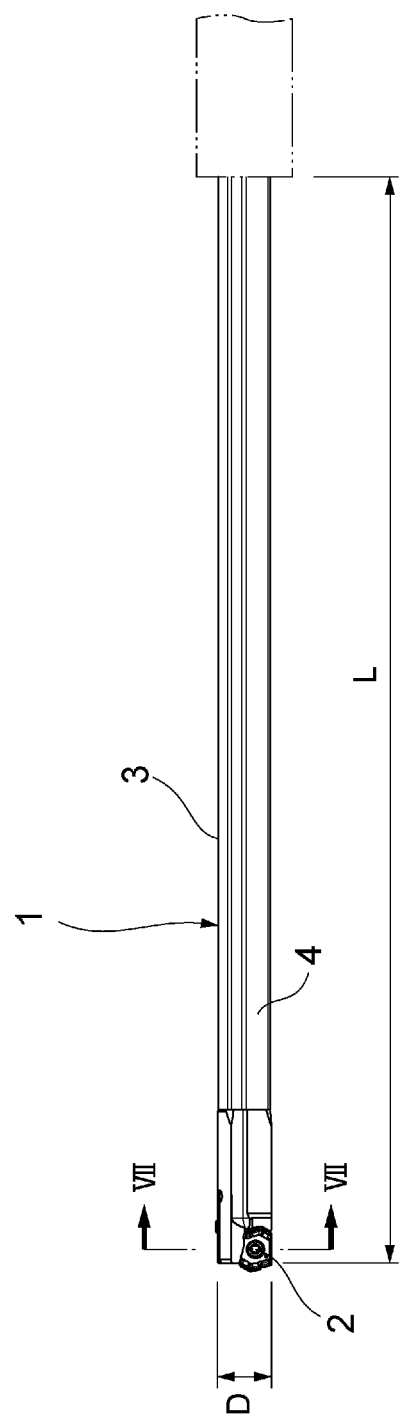
FIG. 1 is a front view of a drilling tool according to one embodiment of the present invention.

One embodiment of the present invention is described below with reference to the drawings. In the drawings, the same reference symbols denote the same or corresponding configurations. One feature of a drilling tool 1 according to each embodiment of the present invention resides in that a bulging portion 7 is formed on a groove wall 42 of a chip discharge groove 4 (see FIG. 2). The bulging portion 7 is formed as a structure integrated with the groove wall 42 (see FIG. 7), and covers a part of a top surface 10 of a cutting insert 2 in plan view (see FIG. 3). The bulging portion 7 can be formed smaller than an external clamp claw, and hence does not occupy a large space in the chip discharge groove 4. Reduction in discharge performance of chips of the drilling tool 1 can be minimized.

Figure 7:
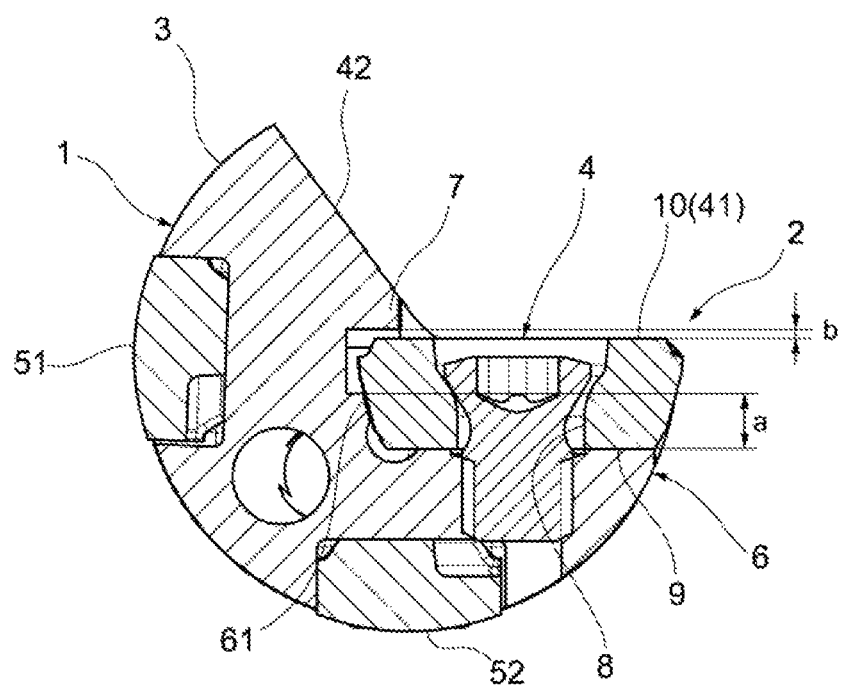
FIG. 7 is a cross-sectional view taken along the line VII-VII in FIG. 1.

The maximum value of the size of a gap b between the bulging portion 7 and the cutting insert 2 is set to be smaller than a height a of a wall constituting a tip seat 6 (see FIG. 7). In this manner, the cutting insert 2 can be prevented from being attached with an incorrect posture. Each cutting edge 11 is divided into partial cutting edges 11a and 11b across a step portion 12 (see FIG. 9), and hence chips flowing out of the cutting edge 11 can be segmentalized.

Figure 10:
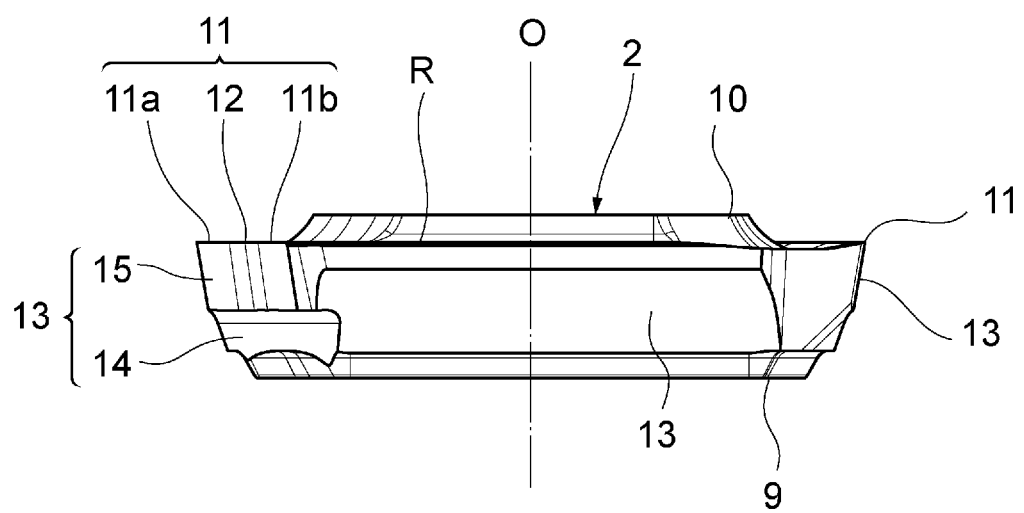
FIG. 10 is a left side view of the cutting insert according to one embodiment of the present invention.
Figure 11:
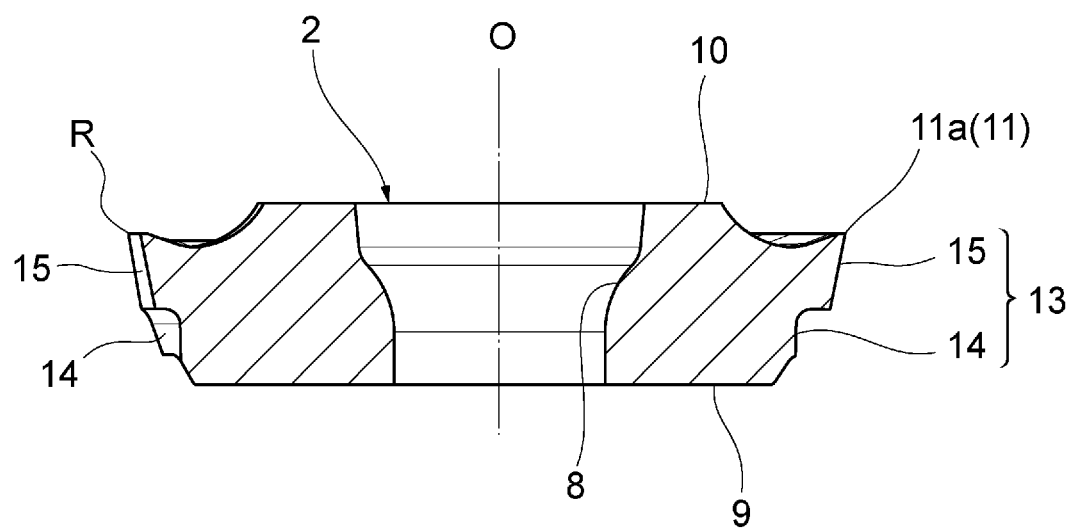
FIG. 11 is a cross-sectional view taken along the line XI-XI in FIG. 9.

A contact surface 14 of the cutting insert 2 is not flush with the cutting edge 11, but is retreated from the cutting edge 11 toward the center O of the cutting insert 2 (see FIG. 11). Even when the cutting edge 11 is divided by the step portion 12, the contact surface 14 that is not divided can be formed on the step portion 12 (see FIG. 8 and FIG. 10), and hence an area sufficient for restricting the cutting insert 2 can be secured. Now, each configuration is described in detail with reference to FIG. 1 to FIG. 11.

FIG. 1 is a front view illustrating the drilling tool 1 according to one embodiment of the present invention. As illustrated in FIG. 1, the drilling tool 1 according to the present embodiment includes the cutting insert 2 and a body 3 to which the cutting insert 2 is mounted. The drilling tool 1 is rotated in the direction indicated by an arrow T to process a deep hole in a workpiece. In the illustrated example, a tool diameter D of the drilling tool 1 is set to 15 mm.

Figure 2:
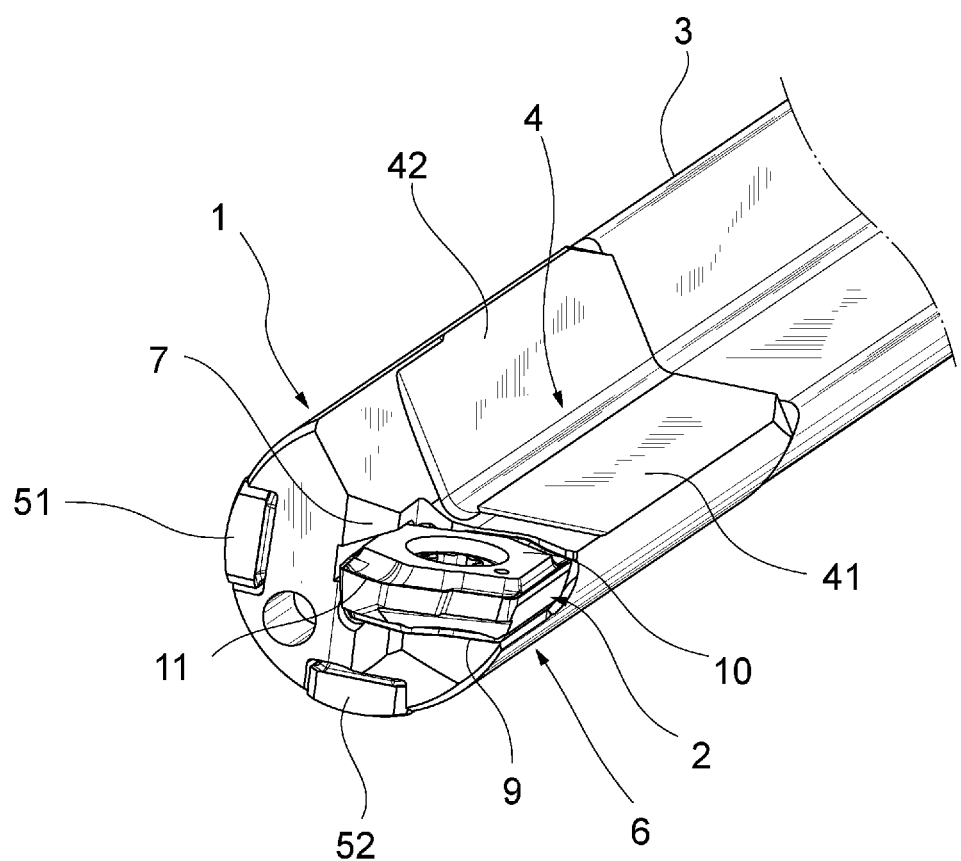
FIG. 2 is an enlarged perspective view illustrating a distal end of the drilling tool according to one embodiment of the present invention.

FIG. 2 is an enlarged perspective view illustrating a distal end of the drilling tool 1. As illustrated in FIG. 2, the body 3 is formed into a substantially cylindrical shape. On an outer peripheral part of the body 3, the chip discharge groove 4 is linearly formed along the center axis line of the body 3. The chip discharge groove 4 is configured by a groove wall (wall surface) 41 and a groove wall (wall surface) 42, and the cross-section thereof has a substantially V shape. When the length of the chip discharge groove 4 is L, L/D of the drilling tool 1 is set to, for example, L/D=10 or more.

Figure 3:
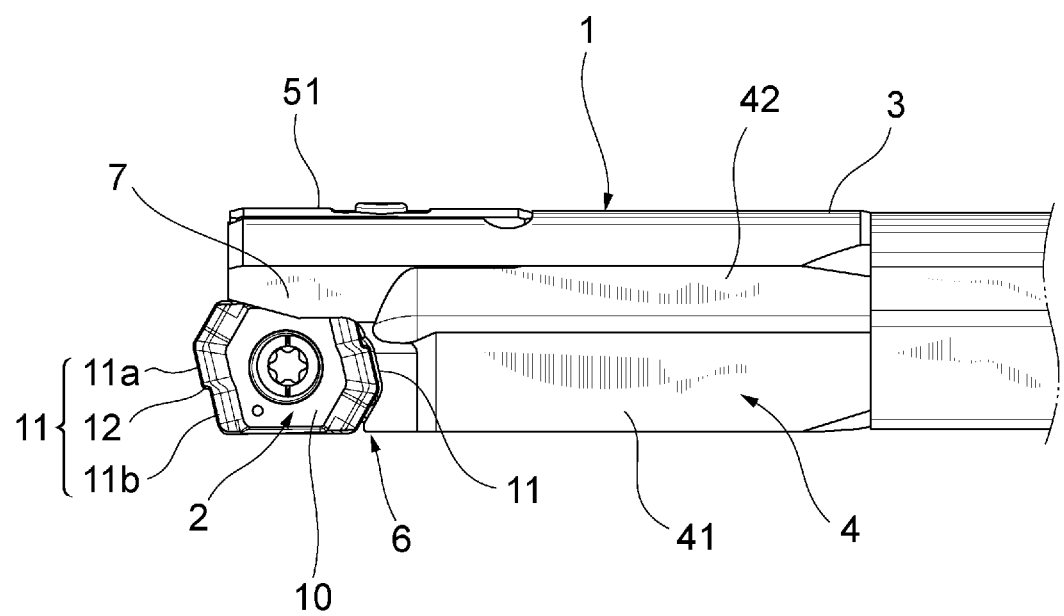
FIG. 3 is an enlarged front view illustrating the drilling tool according to one embodiment of the present invention.

FIG. 3 is an enlarged front view illustrating the drilling tool 1. At the distal end of the drilling tool 1, the groove wall 42 has the bulging portion 7 that protrudes so as to cover a part of the top surface 10 of the cutting insert 2 in front view.

The bulging portion 7 is described in detail later with reference to FIG. 6 and FIG. 7.

Figure 4:
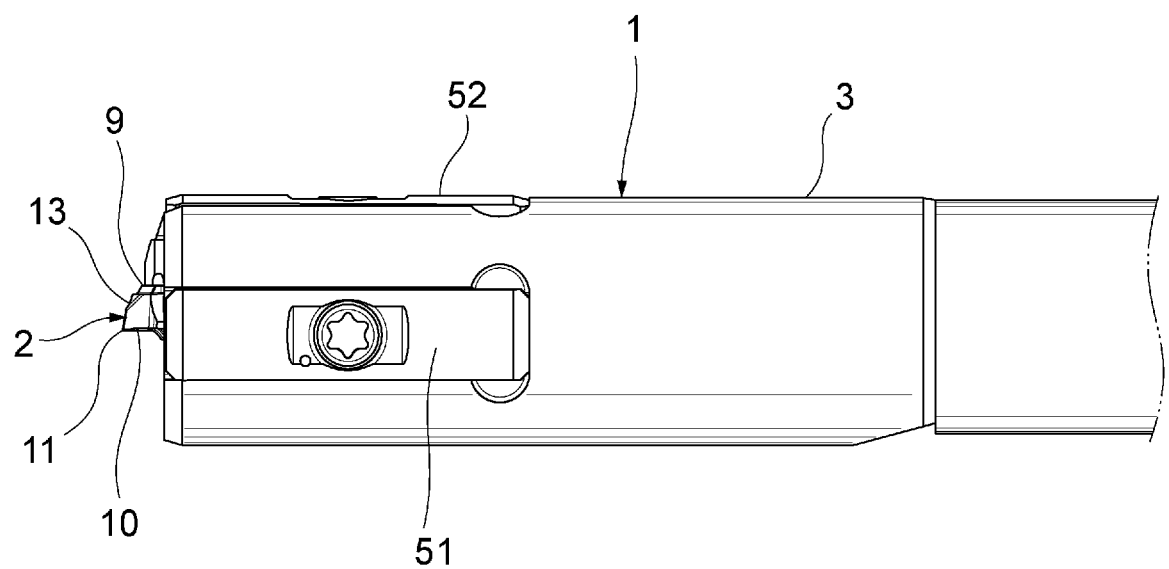
FIG. 4 is an enlarged plan view illustrating the drilling tool according to one embodiment of the present invention.
Figure 5:
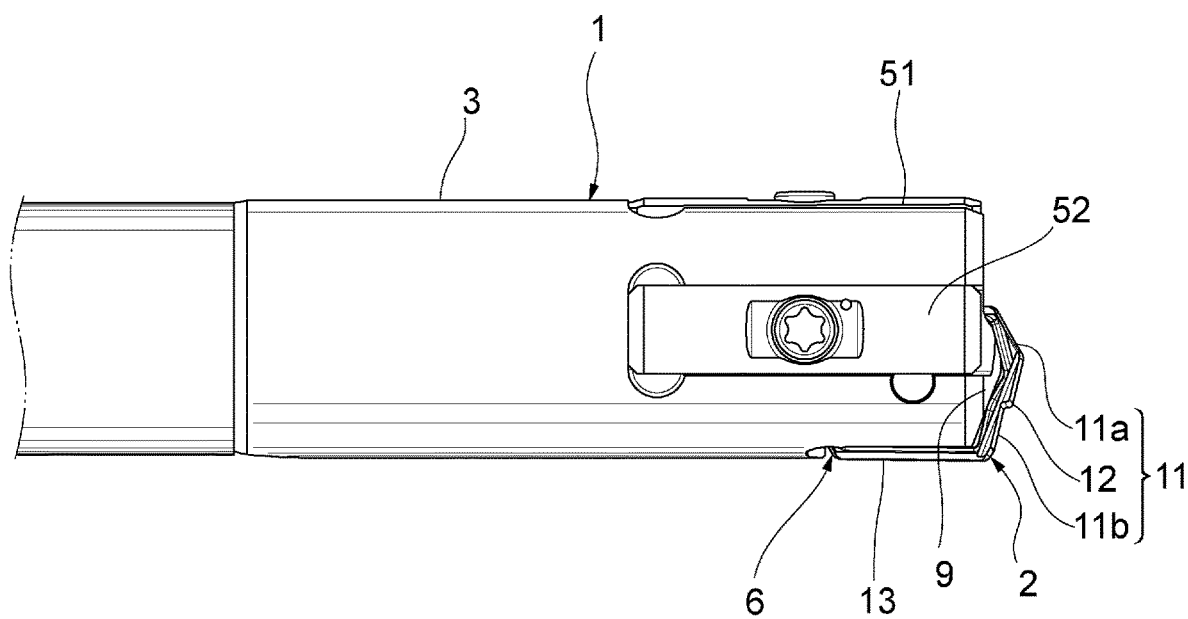
FIG. 5 is an enlarged rear view illustrating the drilling tool according to one embodiment of the present invention.

FIG. 4 is a plan view illustrating a guide pad 51, and FIG. 5 is a rear view illustrating a guide pad 52. As illustrated in FIG. 4 and FIG. 5, the two guide pads 51 and 52 are fixed to the body 3 through screws on the outer circumference of the distal end of the body 3. The guide pads 51 and 52 are replaceable, and hence repolishing of the guide pads, which is burdensome, can be omitted. The guide pads 51 and 52 are disposed so as to support a cutting resistance of the cutting edge 11, prevent breakage of the drilling tool 1 caused by hole bending, and improve circularity, straightness, and processing surface roughness of deep holes.

Figure 6:
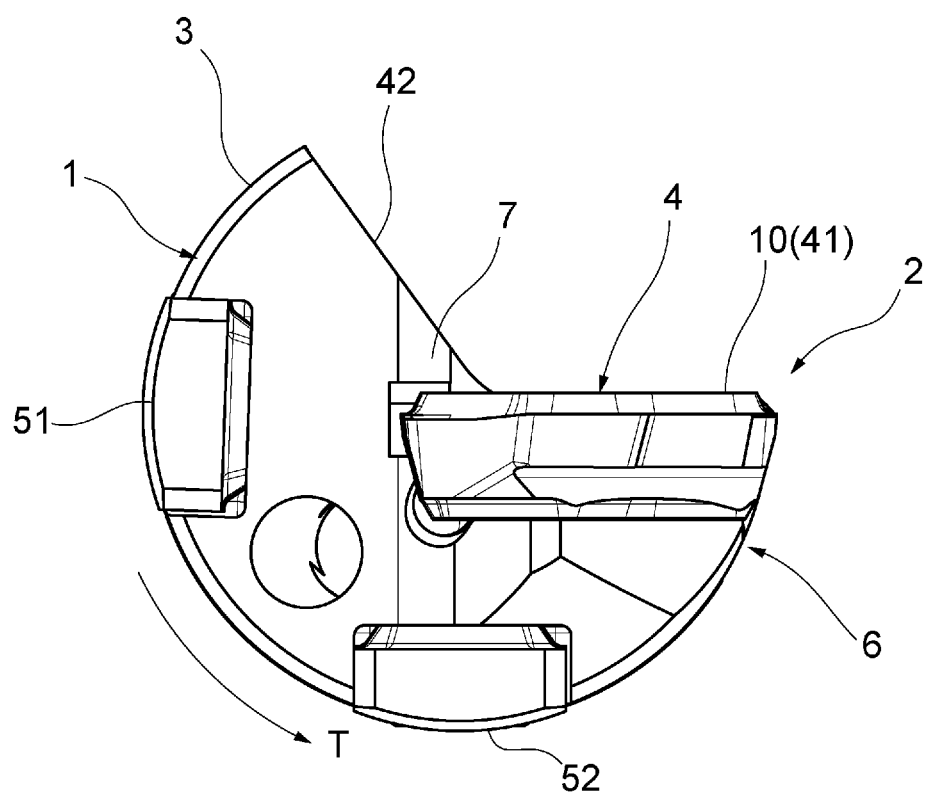
FIG. 6 is a view of the drilling tool as seen from the distal end side according to one embodiment of the present invention.

FIG. 6 is a view of the drilling tool 1 as seen from the distal end side, and FIG. 7 is a cross-sectional view taken along the line VII-VII in FIG. 1. As illustrated in FIG. 6 and FIG. 7, a tip seat 6 for placing the cutting insert 2 thereon is formed at the distal end of the groove wall 41 (see FIG. 2) of the chip discharge groove 4 so as to be recessed with respect to the groove wall 41 of the chip discharge groove 4. Thus, the position of the top surface 10 of the cutting insert 2 mounted to the tip seat 6 is at substantially the same height as the groove wall 41 of the chip discharge groove 4. Among the groove walls 41 and 42 of the chip discharge groove 4, at a distal end of the groove wall 42 that faces in a direction opposite to the rotating direction T, a bulging portion 7 is formed integrally with the groove wall 42.

The bulging portion 7 is formed so as to protrude to the outer peripheral direction of the body 3, and a gap b is formed between the bulging portion 7 and the cutting insert 2. When the drilling tool 1 is seen from a direction opposed to the top surface 10 of the cutting insert 2, the bulging portion 7 covers a part of the top surface 10 of the cutting insert 2. In other words, as illustrated in the cross-sectional view of FIG. 6, the bulging portion 7 is disposed above the top surface 10 of the cutting insert 2. The drilling tool 1 according to the present embodiment has the bulging portion 7 for restricting the movement in a direction in which the cutting insert 2 floats in addition to a screw for pressing the inner peripheral surface of the screw hole 8 of the cutting insert 2, and hence can reliably fix an even small-diameter cutting insert 2.

Further, the maximum value of the size of the gap b between the bulging portion 7 and the cutting insert 2 is set to be smaller than the height a of the wall constituting the tip seat 6. In a strict sense, the maximum value of the gap b is set to be smaller than a height a of a part 61 of the wall constituting the tip seat 6 that is in contact with the cutting insert 2 (hereinafter, this part is referred to as "restriction wall"). Note that the height a of the restriction wall 61 may be different depending on parts and depending on the side surface shape of the cutting insert 2. In this case, the maximum value of the gap b between the bulging portion 7 and the cutting insert 2 is set with reference to a lower height a.

If the drilling tool has no bulging portion 7, the cutting insert 2 can be placed from a direction perpendicular to the bottom surface of the tip seat 6, and hence the cutting insert 2 may be mounted while being inclined with respect to the bottom surface of the tip seat 6 such that the restriction wall 61 of the tip seat 6 and the bottom surface of the cutting insert 2 are in contact with each other. On the other hand, in the drilling tool 1 according to the present embodiment illustrated in FIG. 7, the bulging portion 7 is formed such that the maximum value of the gap b is smaller than the height a of the restriction wall 61, and hence the cutting insert cannot be placed from the direction perpendicular to the bottom surface of the tip seat 6. The cutting insert 2 can be prevented from being mounted with an incorrect posture.

Figure 8:
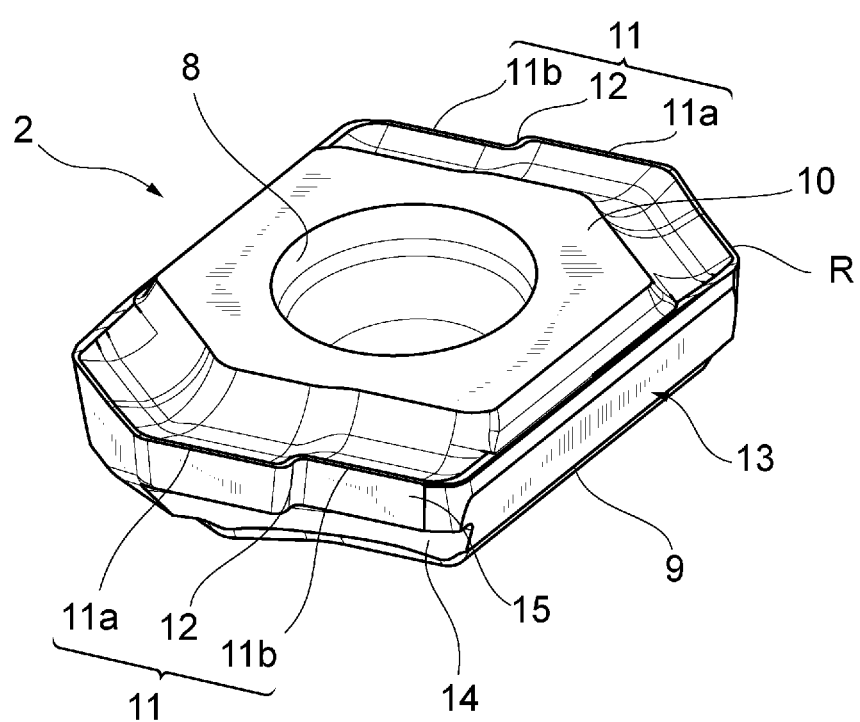
FIG. 8 is a perspective view of a cutting insert according to one embodiment of the present invention.

FIG. 8 is a perspective view of the cutting insert 2 according to one embodiment of the present invention. As illustrated in FIG. 8, the cutting insert 2 has a top surface 10 serving as a rake face, a bottom surface 9 on the opposite side of the top surface 10, and a side surface 13 connecting the top surface 10 and the bottom surface 9. At the center O of the cutting insert 2, a screw hole 8 passing through the top surface 10 and the bottom surface 9 is formed.

The cutting edge 11 is formed on a ridge line R at which the top surface 10 and the side surface 13 intersect each other. In the illustrated example, a pair of cutting edges 11 are formed on one side of the ridge line R and the other side on the opposite side of the one side. Note that the number of the cutting edges 11 formed on the ridge line R is not limited, and may be one and may be three or more. The pair of cutting edges 11 are formed point-symmetrically about the center O of the cutting insert 2. The side surface 13 includes a pair of parts 15 connected to the cutting edges 11 and a pair of contact surfaces 14 adjacent to the parts 15. The part 15 and the contact surface 14 are described in detail later with reference to FIG. 10 and FIG. 11.

Figure 9:
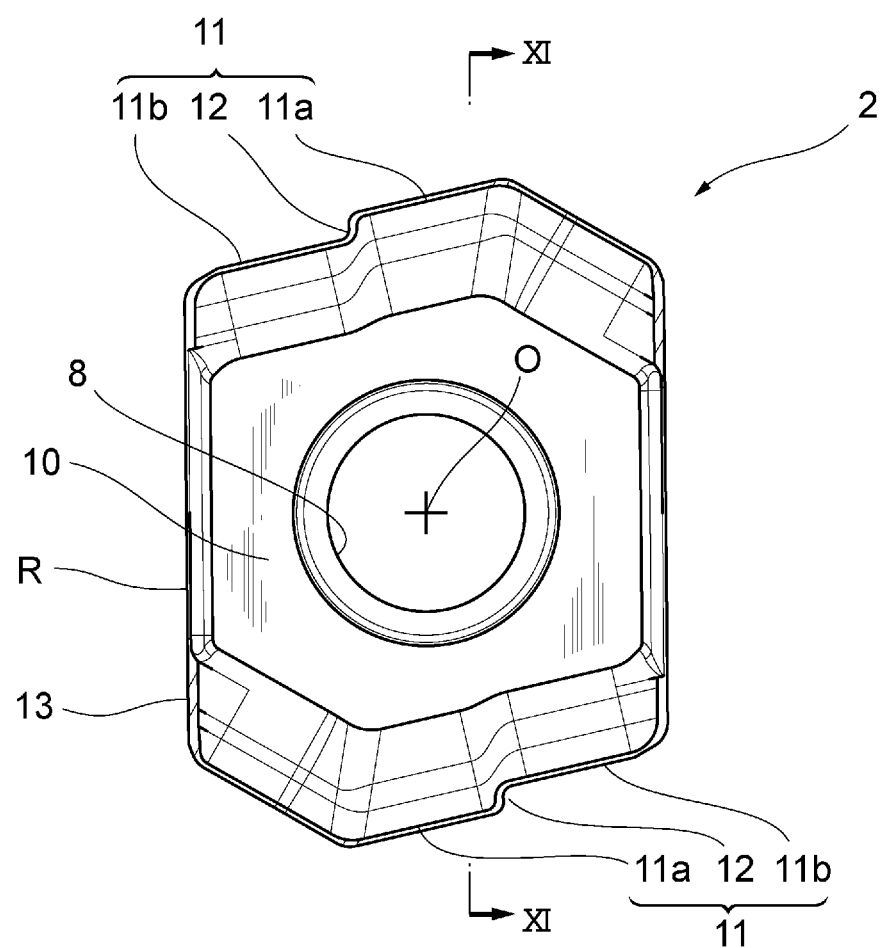
FIG. 9 is a front view of the cutting insert according to one embodiment of the present invention.

FIG. 9 is a front view of the cutting insert 2. As illustrated in FIG. 9, when the cutting insert 2 is seen from the direction opposed to the top surface 10, the cutting edges 11 formed on the cutting insert 2 each have a step portion 12. Specifically, when comparing the position of a partial cutting edge 11a located on the left side in the figure across the step portion 12 and the position of a partial cutting edge 11b located on the right side of the step portion 12, the partial cutting edge 11b is located at a position retreated toward the center O of the cutting insert 2. Because the cutting edge 11 has the step portion 12, the cutting edge 11 is divided into the partial cutting edges 11a and 11b, and chips flowing out of the cutting edge 11 are divided and segmentalized.

FIG. 10 is a left side view of the cutting insert 2, and FIG. 11 is a cross-sectional view taken along the line XI-XI in FIG. 8. As illustrated in FIG. 10 and FIG. 11, a contact surface 14 that contacts the wall constituting the tip seat 6 is formed on the side surface 13 of the cutting insert 2. The contact surface 14 is formed at a position relatively closer to the bottom surface 9 than a part 15 of the side surface 13 that is connected to the cutting edge 11. As illustrated in the cross-sectional view of FIG. 10, the contact surface 14 is located at a position retreated from the cutting edge 11 toward the center O of the cutting insert 2. In other words, the contact surface 14 is formed on the lower side of the part 15 in the height direction along the center axis line of the cutting insert 2, and is recessed from the part 15 toward the center O in the radial direction extending radially from the center O.

Next, the effects of the above-mentioned embodiment are described. The bulging portion 7 is formed integrally with the groove wall 42 of the chip discharge groove 4, and hence it is sufficient when the area to cover the top surface 10 of the cutting insert 2 is smaller than hitherto, and as a result, a large cross-sectional area of the chip discharge groove 4 can be secured.

Even when the tool diameter D of the drilling tool 1 is set to, for example, 15 mm or less, the cutting insert 2 can be prevented from being mounted with an incorrect posture because the bulging portion 7 is formed. Specifically, when the tool diameter D of the drilling tool 1 is set to 15 mm or less, it is difficult to reduce the size of the cutting insert 2 correspondingly to the reduction in tool diameter, and hence if the cutting insert 2 is placed from a direction perpendicular to the bottom surface of the tip seat 6, the restriction wall 61 of the tip seat 6 and the bottom surface of the cutting insert 2 may contact each other, and the cutting insert 2 may be mounted while being inclined with respect to the bottom surface of the tip seat 6.

On the other hand, according to the present embodiment in which the bulging portion 7 is formed, the cutting insert 2 cannot be placed from the direction perpendicular to the bottom surface of the tip seat 6, and the cutting insert 2 can be placed from only a direction parallel to the bottom surface of the bottom surface of the tip seat 6. Thus, the cutting insert 2 can be prevented from being mounted to the tip seat 6 with an inclined posture.

The embodiments have been described to facilitate the understanding of the present invention and should not be interpreted as limiting the present invention. The elements included in the embodiments and their arrangement, materials, conditions, shapes, and sizes are not limited to the exemplified ones and can be changed as appropriate. Configurations described in different embodiments can be partially replaced or combined.

What is claimed is:

1. An indexable drilling tool, comprising:
   a cutting insert having a top surface, an oppositely positioned bottom surface, and a peripheral side surface connecting the top and bottom surfaces; and
   a body that has a cylindrical shape, has a chip discharge groove in an outer circumference thereof, and has, at a distal end thereof, a tip seat where the cutting insert is exchangeably placed, wherein:
   among groove walls constituting the chip discharge groove, a first groove wall facing in a direction opposite to a rotating direction of the body has, at a distal end thereof, a bulging portion that protrudes so as to cover a part of a top surface of the cutting insert; and
   a maximum value of a size of a gap between the bulging portion and the top surface of the cutting insert is smaller than a height of a wall constituting the tip seat, wherein
   the cutting tool has only one tip seat and only one cutting insert,
   the peripheral side surface of the cutting insert has a first side surface and an oppositely positioned second side surface, the first side surface extending between two connecting side surfaces respectively connecting the first side surface to the second side surface, the first side surface comprises
   a clearance surface intersecting a cutting edge, and
   a contact surface that contacts the wall constituting the tip seat, the contact surface extending partially along a length of the first side surface, the length of the first side surface being defined between the two connecting faces,
   when seen in a cross-section perpendicular to the cutting edge, the contact surface is retreated, from each of the cutting edge and the clearance surface, toward a center of the cutting insert, and
   the contact surface is formed at a position relatively closer to the bottom surface than the clearance surface.

2. The indexable drilling tool according to claim 1, having a tool diameter of 15 mm or less.

3. The indexable drilling tool according to claim 1, wherein when the cutting insert is seen from a direction opposed to the top surface, a ridge line has a plurality of steps.

4. The indexable drilling tool according to claim 2, wherein when the cutting insert is seen from a direction opposed to the top surface, a ridge line has a plurality of steps.

5. The indexable drilling tool according to claim 1, wherein L/D is 10 or more, where L represents a length of the chip discharge groove, and D represents a tool diameter.

6. The indexable drilling tool according to claim 2, wherein L/D is 10 or more, where L represents a length of the chip discharge groove, and D represents a tool diameter.

7. The indexable drilling tool according to claim 3, wherein L/D is 10 or more, where L represents a length of the chip discharge groove, and D represents a tool diameter.

8. The indexable drilling tool according to claim 4, wherein L/D is 10 or more, where L represents a length of the chip discharge groove, and D represents a tool diameter.

9. The indexable drilling tool according to claim 1, wherein the bulging portion is integrated with the first groove wall of the chip discharge groove.

\* \* \* \* \*